United States Patent Office 3,431,227
Patented Mar. 4, 1969

3,431,227
PROCESS FOR PREPARING RUBBERY 1,3-DIENE POLYMERS BY POLYMERIZING 1,3-DIENES IN THE PRESENCE OF A PREFORMED POLYMER
Ernst-Guenther Kastning, Assenheim, Pfalz, and Herbert Naarmann, Ludwigshafen (Rhine), Germany, assignors to Badische Anilin- & Soda-Fabrik Aktiengesellschaft, Ludwigshafen (Rhine) Germany
No Drawing. Filed Oct. 22, 1965, Ser. No. 502,404
Claims priority, application Germany, Nov. 7, 1964, B 79,249
U.S. Cl. 260—29.7  3 Claims
Int. Cl. C08d 7/00; C08g 41/04, 41/02

ABSTRACT OF THE DISCLOSURE

Process for preparing rubbery 1,3-diene polymers by polymerizing 1,3-dienes in aqueous emulsion in the presence of a preformed synthetic polyether, polyamide and/or polyurethane, said polymer having a crystallinity of more than 30% by weight, and having at least one vinyl and/or vinylidene group.

---

This invention relates to the polymerization of 1,3-dienes in aqueous emulsion in the presence of preformed polymers.

The production of elastomeric 1,3-diene polymers by polymerization of 1,3-dienes, such as butadiene and isoprene, in aqueous emulsion using peroxide catalysts has been known for a long time. Recently metal chelate complexes, such as cobalt or chromium acetylacetonate, have been described as polymerization catalysts. Mainly copolymers of butadiene with styrene and/or acrylonitrile have been prepared on an industrial scale by the emulsion polymerization method.

The comparatively low strength values of synthetic rubbers prepared by prior art methods, particularly of unloaded stocks, is a considerable disadvantage. Whereas natural rubber has a tensile strength of about 200 kg./sq. cm. in the unloaded vulcanized condition, the tensile strengths of unloaded vulcanized styrene-butadiene rubbers are less than 10 kg./sq. cm.

It is furthermore known from German patent specification No. 821,267 that copolymers may be prepared from butadiene and acrylonitrile in aqueous emulsion in the presence of natural rubber, balata or gutta-percha, using peroxide catalysts. The products are however graft polymers which are insoluble, exhibit large elastic fractions and are unsatisfactory in rolling and extrusion behavior because the degree of crosslinking is too high.

Finally it is known from Belgian patent specification No. 565,853 that butadiene may be polymerized in the presence of a copolymer of 85% by weight of styrene and 15% by weight of butadiene, but the products prepared by this process have poor strength values, for example tensile strengths of less than 15 kg./sq. cm.

It is an object of the present invention to prepare by polymerization of 1,3-dienes in aqueous emulsion, 1,3-diene polymers which exhibit improved strength values, particularly improved tensile strength. Other objects and advantages of this invention will be apparent from the following description.

We have found that elastomeric 1,3-diene polymers having improved strength values are obtained in the polymerization of 1,3-dienes in aqueous emulsion using conventional polymerization catalysts in the presence of preformed polymers by using as the preformed polymer a crystalline polyether, polyamide and/or polyurethane which contains at least one vinyl group or vinylidene group.

Crystalline polymers which are suitable for the process of this invention in general exhibit a crystallinity (determined according to S. Krimm and A. V. Tobolsky, J. Polym. Sci., 5, 57 (1951) with a counter X-ray spectrometer (CuK alpha radiation, 40 kv., 20 mA.)) of more than 30% and polymers whose crystallinity is more than 50% are preferred for the process. The crystalline polyethers polyamides and polyurethanes are the better suited for the process the higher their crystallinity is. In general the higher the crystallinity of the polymers, the smaller the amount which it is necessary to use in the new process.

Crystalline polymers of the said type should contain at least one vinyl group or vinylidene group. In general they have good suitability if they contain one to four vinyl groups and/or vinylidene groups, and polyethers, polyamides and/or polyurethanes are preferred which contain one or two vinyl groups and/or vinylidene groups per molecule. They may be prepared for example from the corresponding polyethers, polyamides or polyurethanes by reaction by conventional methods with acrylic acid and/or methacrylic acid and/or derivatives thereof, such as halides or anhydrides. No claim is made herein to the production of the crystalline polymers containing vinyl groups or vinylidene groups per se.

Polyethers suitable as starting materials may be prepared for example from ethylene oxide or from ethylene oxide and propylene oxide. In general they have molecular weights of from 1,000 to 50,000 and may be provided at one or both ends of the chain with acrylyl or methacrylyl groups by reaction with unsaturated vinyl compounds or vinylidene compounds, such as methacrylyl or acrylyl chloride. Polyethers which have been prepared by etherification of unsaturated aliphatic diols, such as butenediol-1,2, butenediol-1,4, hexenediol-1,6, octenediol-1,8 and octynediol-1,8, or corresponding saturated diols or alkanediols with ethylene oxide or mixtures of at least 60% of ethylene oxide and propylene oxide and by providing the products with methacrylyl or acrylyl groups by reaction with the appropriate acids or acid chlorides, may also be used. Suitable aliphatic diols are alkanols which preferably have two to ten carbon atoms and two terminal hydroxyl groups. They are preferably linear, but may also be branched.

Particularly suitable polyethers having at least one vinyl group or vinylidene group are those having the general formulae:

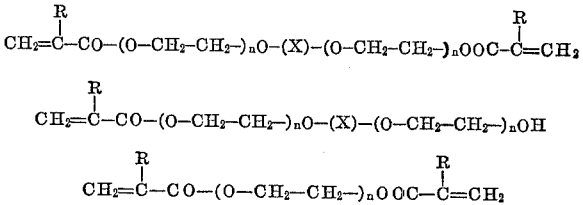

and

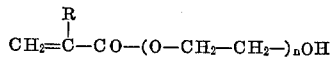

in which X denotes a divalent saturated or unsaturated linear or branched aliphatic, cycloaliphatic or aromatic radical having preferably two to ten carbon atoms, R denotes a hydrogen atom or a methyl group and $n$ denotes one of the integers from 20 to 120.

Examples of polyamides containing vinyl groups or vinylidene groups which are suitable as starting products are synthetic polyamides which have been prepared by conventional methods from lactams having four to twelve ring carbon atoms, such as pyrrolidone, caprolactam, capryllactam, oenantholactam and laurolactam, and/or salts of diamines, such as hexamethylene diamine, octamethylene diamine and decamethylene diamine, and dicarboxylic acids, such as adipic acid, heptanedicarboxylic acid sebacic acid and pimelic acid. The compounds containing vinyl groups or vinylidene groups prepared from polyamides of the said type also generally have molecular weights of from 1,000 to 50,000. Diamines and carboxylic acids used for their production in general contain four to ten carbon atoms, preferably six carbon atoms, are usually linear and in general have terminal amino groups or carboxyl groups.

Polyurethanes which are suitable as starting materials for polyurethanes containing at least one vinyl group or vinylidene group may be prepared by conventional methods from diisocyanates, such as hexamethylene diisocyanate, 1,4-toluylene diisocyanate, 1,4-phenylene diisocyanate, 4,4'-diphenyl diisocyanate and diphenylmethane-4,4' diisocyanate, and diols, such as 1,4-butanediol, 1,5-pentanediol, 1,6-hexanediol, 1,4-cyclohexanediol and 4,4'-dihydroxydiphenylmethane. Like the other preformed crystalline polymers, the polyurethanes containing at least one vinyl group or vinylidene group have molecular weights of from 1,000 to 50,000. Particularly suitable polyurethanes containing a vinyl group or a vinylidene group are those derived fro neopentylglycol, butanediol-1,4, hexanediol-1,6 and tolyl diisocyanate, and particularly suitable polyamides are those derived from pyrrolidone, octamethylene diamine and adipic acid.

The crystalline compounds are in general used in amounts of 0.1 to 50% by weight, preferably 5 to 25% by weight (with reference to the total weight of polymer, i.e. the sum of crystalline compound and monomers) and may either be present from the start or may be added continuously during the polymerization. They are preferably used as finely divided powders or in the form of suspensions.

The process according to this invention may be carried out with conventional polymerization catalysts, such as free radical forming substances, for example inorganic and organic peroxides, azo-bis-carboxylic acid derivatives, redox systems and/or metal chelate complexes. Polymerization is in general carried ous at from −10° to 100° C., preferably from +5° to 50° C. Redox systems are preferably used in low temperature polymerization, i.e. at temperatures below room temperature. Particularly interesting products are obtained by the use of metal chelate complexes as catalysts, for example acetylacetonates and/or benzoylacetonates of chromium, manganese, copper, cobalt and nickel. The type of catalyst is not critical for the process.

Pressure conditions may be varied within wide limits in the process. Polymerization is in general carried out at pressures of from atmospheric pressure to 20 atmospheres. In special cases however higher pressures may be used. The pressure conditions are not critical for the process.

Conventional emulsifiers, such as alkali metal salts of paraffinsulfonic acids, sulfonated alkylphenols, alkali metal salts of higher fatty acids or resin acids and protective colloids, such as dextrans, cellulose ethers or polyvinyl alcohols, may also be used in the process. They are used in conventional amounts, for example from 0.5 to 10% by weight with reference to the polymer. The aqueous phase may also contain buffer substances and/or regulators, for example dodecylmercaptan. The type of emulsifier and regulator is also not characteristic for the process.

Mainly 1,3-dienes having four to ten carbon atoms and whose conjugated double bonds are not components of a ring system are suitable for the process. The 1,3-dienes may for example bear halogen atoms or alkoxy groups as substituents.

Butadiene and isoprene are particularly suitable 1,3-dienes for the process; others are 2,3-dimethylbutadiene, 2-phenylbutadiene and 2-chlorobutadiene. The 1,3-dienes may also be used mixed together in any proportions.

In the new process the 1,3-dienes may be polymerized mixed with ethylenically unsaturated compounds, but the 1,3-diene component should amount to at least 50% by weight with reference to the total amount of monomers. Monoethylenically unsaturated compounds which are suitable for the copolymerization are particularly $\alpha,\beta$-unsaturated polymerizable carboxylic acids and their derivatives, chiefly acrylic acid and methacrylic acid and their esters with alkanols containing one to eight carbon atoms, such as the methyl, ethyl, n-propyl, n-butyl, isobutyl, tertiary-butyl, and 2-ethylhexyl esters, their amides (which may be substituted on the nitrogen atom), for example acrylamide and methacrylamide, the N-methylol derivatives of acrylamide and methacrylamide, and also acrylonitrile, methacrylonitrile, monovinylaromatic compounds, such as styrene and methylstyrenes, vinyl ethers of alkanols having one to four carbon atoms, such as vinyl methyl ether, vinyl n-butyl ether and vinyl isobutyl ether, and also esters of $\alpha,\beta$-ethylenically unsaturated carboxylic acids containing at least four carbon atoms with alkanols containing one to four carbon atoms, for example esters of fumaric and maleic acids, particularly the ethyl and n-butyl esters, and also vinyl ketones having four to six atoms, such as vinyl methyl ketone and isopropenyl methyl ketone. Styrene and acrylonitrile are of particular interest as comonomers.

The process may be carried out continuously or batchwise. When working continuously, a packed reactor or a cascade of reactors may for example be used as the reaction vessel. Polymerization is in general carried on to a conversion of about 70%. It is also possible however to carry the polymerization to higher conversions, for example up to 90% or more. It is preferred to carry on the polymerization to a conversion of only 55 to 60%. In the process it is of particular advantage, especially when using metal chelate complexes as catalysts, to mix the components of the catalyst with the crystalline polymer and either to start the polymerization therewith or to add it continuously during the course of the polymerization.

It is also possible to emulsify the cataylst components in a portion of the aqueous reaction medium and to supply the catalyst emulsion to the polymerization vessel. The individual components may however be added separately.

Polymers prepared by the process according to this invention are obtained in the form of aqueous dispersions which in general contain from 5 to 55% by weight of polymer.

High molecular weight polymers whose K-value is in general from 50 to 110 are obtained by the process. They have crystalline fractions and, contrasted with prior art styrene-butadiene rubbers, they behave anisotropically in polarized light. The products are distinguished by particularly high strength values, above all particularly high tensile strength as well as stability under load and flexural strength, and moreover they have improved elongation in the vulcanized and unvulcanized, loaded or unloaded condition.

The polymers are suitable for example for the production of motor car tires or as additives to other plastics, such as polyolefins. They exhibit excellent compatability with conventional extenders, for example unsaturated extender oils.

The invention is further illustrated by the following examples in which parts specified are parts by weight. The K-values given therein have been determined in 1% solution in benzene and the solution viscosities in 5% solution in styrene.

EXAMPLE 1

450 parts of water, 25 parts of a 20% aqueous solution of the sodium salt of a fatty acid having eight to fifteen carbon atoms and a mixture of 0.7 part of cobalt(III)

acetylacetonate and 25.0 parts of a polyether vinylidene compound having the general formula:

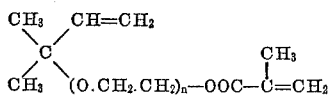

in which $n$ has a value of from 75 to 105, are placed in an autoclave. 150 parts of butadiene is added to this mixture while stirring. Polymerization is carried on for ten hours at 55° C. and a dispersion is obtained having a solids content of 21% by weight equivalent to a conversion of 68%.

0.5 part of phenyl-β-naphthylamine is added to the dispersion as a stabilizer.

The polymer is soluble without gel formation in the conventional solvents, has a crystalline fraction of about 10% and after vulcanization exhibits an ultimate tensile strength of 187 kg./sq. cm.

A comparative polymer which has been prepared without adding the polyether vinylidene compound but otherwise in the same way is amorphous and has an ultimate tensile strength of only 143 kg./sq. cm. after having been vulcanized.

Vulcanization is carried out under standard conditions with a mixture of 100 parts of polymer, 50 parts of carbon black CK 3, 2 parts of stearic acid, 3 parts of zinc oxide RS, 5 parts of an unsaturated extender oil (known under the registered trade mark Naftolen ZD), 1.5 parts of phenyl-β-naphthylamine, 175 parts of sulfur and 1 part of a conventional vulcanization accelerator (known under the registered trade mark Vulkazite AZ) at 142° C. and 3 atmospheres gauge in forty minutes.

EXAMPLE 2

20 parts of a compound having the formula:

$$CH_2=CH-COO-(CH_2-CH_2-O)_{47}-CH_2-CH=$$
$$CH-CH_2-(O-CH_2-CH_2)_{47}-OOC-CH-CH_2$$

70 parts of butadiene and 0.2 part of $n$-dodecylmercaptan are added to a mixture of 200 parts of water, 4.5 parts of the potassium salt of an abietic acid mixture and then polymerization is carried to a conversion of 60% within twelve hours at 5° C. with an addition of 0.1 part of $p$-menthane hydroperoxide, 0.08 part of copperas, 0.01 part of ethylenediaminotetracetic acid, 0.15 part of potassium pyrophosphate and 0.01 part of dextrose.

A polymer is obtained having a crystalline fraction of 17%, a K-value of 93 and, after having been vulcanized in the unloaded condition, an ultimate tensile strength of 97 kg./sq. cm.

Polybutadiene which has been prepared without adding the polyether vinyl compound, but in otherwise the same way, has an ultimate tensile strength of 8 kg./sq. cm. after it has been vulcanized unloaded.

The polyether vinyl compound is prepared as follows: 500 parts of ethylene oxide is pressed into 10 parts of butenediol-1,4 in the presence of 0.01 part of sodium methylate at 110° C. and 30 atmospheres gauge pressure. After working up the product and evaporating low boiling point constituents, a polyether is obtained which contains an average of 47 O—CH$_2$—CH$_2$ groups twice. This is then reacted with the equivalent amount of acrylic acid in the presence of 1,000 parts of benzene and the water is distilled off azeotropically. The diacrylic ester having the formula given at the beginning of this example is obtained.

EXAMPLE 3

10 parts of polypyrrolidone having a molecular weight of 3,600 and containing an average of two methacrylyl groups per molecule, 100 parts of butadiene, 5 parts of $n$-butyl acrylate, 15 parts of tertiary-dodecylmercaptan, 2 parts of sodium acetate and 1.2 parts of potassium persulfate are added to a mixture of 500 parts of water and 50 parts of a 10% solution of the sodium salts of a mixture of fatty acids having twelve to twenty carbon atoms. Polymerization is carried on for thirty hours at 50° C. and a dispersion is obtained having a solids content of 16% by weight. The product has a K-value of 98.5, a Mooney plasticity (ASTM 927–57T) ML–4′/100° C. of 43 and at 80° C. a Defo value 1050/35 (DIN 53,514). The ultimate tensile strength of the polymer after vulcanization in the unloaded condition is 103 kg./sq. cm.

If butadiene be polymerized without the addition of polypyrrolidone, but otherwise under the same conditions, a polybutadiene is obtained which after vulcanization has an ultimate tensile strength of only 12 kg./sq. cm. when tested under the same conditions.

The pyrrolidone containing methacrylyl groups is prepared as follows: 2 parts of methacrylyl chloride is added to a mixture of 35 parts of polypyrrolidone, 100 parts of toluene and 100 parts of dimethylformamide and the mixture is heated in the presence of 0.01 part of metadinitrobenzene for half an hour at 110° C. The solvent is then evaporated in vacuo at 0.1 mm. Hg.

EXAMPLE 4

By following the procedure described in Example 1 but using, instead of the polyether vinylidene compound, the same amount of a polyurethane containing an acrylyl group, a product is obtained having a crystallinity of 23% which after having been vulcanized in the unloaded condition has an ultimate tensile strength of 112 kg./sq. cm.

Polybutadiene which has been prepared without adding the polyurethane vinyl compound, but under otherwise identical conditions, has after vulcanization an ultimate tensile strength of only 8 kg./sq. cm.

The polyurethane vinyl compound is prepared analogously to the polyamide derivative in Example 3 from 25 parts of commercial polyurethane from 11 parts of tolulyene diisocyanate and 12 parts of butanol-1,4 having a molecular weight of 2,900.

EXAMPLE 5

The procedure of Example 1 is followed but using a polyether having the general formula:

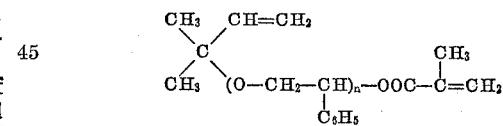

in which $n$ has the value of 75 to 105. A dispersion is obtained having a solids content of 24.3% by weight.

The polymer has a crystalline fraction of 14% and after having been vulcanized under standard conditions has an ultimate tensile strength of 192 kg./sq. cm. and an elongation of 435%.

EXAMPLE 6

The procedure of Example 1 is followed but using a polyethylene having the general formula:

$$CH_2=CH-COO-(CH_2-CH_2-O)_n-CH_2-CH=$$
$$CH-CH_2-(O-CH_2-CH_2)_n-OOC-CH-CH_2$$

in which $n$ has a value of 25 to 30. A dispersion is obtained having a solids content of 20.9% by weight. The polymer has a crystalline fraction of 9% and after having been vulcanized under standard conditions has an ultimate tensile strength of 185 kg./sq. cm. and an elongation of 390%.

EXAMPLES 7 TO 16

Polymerization is carried out as in Example 1 but in each case 20 parts of one of the following comonomers is used additionally to the butadiene. The results given in the following table are achieved. No.=Example No.; SC=solids content in percent by weight; CF=crystalline fraction in percent; TS=tensile strength in kg./sq. cm.; and E=elongation in percent.

| No. | Comonomer | SC | CF | TS | E |
|---|---|---|---|---|---|
| 7 | n-Butyl acrylate | 25.2 | 6 | 164 | 450 |
| 8 | Acrylamide | 24.7 | 8-9 | 175 | 410 |
| 9 | N-methylolacrylamide | 22.5 | 8 | 186 | 380 |
| 10 | Vinyl ethyl ether | 21.1 | 6-7 | 159 | 453 |
| 11 | Styrene | 27.5 | 9 | 190 | 405 |
| 12 | Diethyl fumarate | 23.2 | 6 | 187 | 395 |
| 13 | n-Butyl maleate | 22.8 | 6 | 189 | 400 |
| 14 | Isoprene | 16.3 | 9 | 183 | 410 |
| 15 | 2-chlorobutadiene | 20.4 | 9 | 179 | 405 |
| 16 | 2,3-dichlorobutadiene | 19.1 | 10 | 187 | 385 |

EXAMPLE 17

The procedure of Example 2 is followed but there is additionally used 25 parts of a polyamide which has been prepared by reacting polycaprolactam having a K-value of 26 in dimethylformamide with acrylyl chloride, 2 acrylyl groups being present per mole of polycarprolactam. A polymer is obtained having 24% of crystalline fraction which has an ultimate tensile strength of 102 kg./sq. cm. after having been vulcanized in the unloaded condition.

The dispersion obtained by the above method has a solids content of 27.2% by weight, equivalent to a conversion of about 82%.

EXAMPLE 18

The procedure of Example 17 is followed but 0.6 part of potassium persulfate is used as initiator and polymerization is carried out at 50° C. A dispersion is obtained which has a solids content of 29.3% by weight equivalent to a conversion of about 87%. The polymer has a crystalline fraction of 25% and after having been vulcanized in the unloaded condition has an ultimate tensile strength of 105 kg./sq. cm. and an elongation of 315%.

EXAMPLE 19

The procedure of Example 18 is followed but there is additionally used 10 parts of a polyurethane which has been obtained by reaction of hexamethylene diisocyanate with glycerol in the molar ratio 1:1 and with which each mole has been reacted with 1 mole of methacrylic acid. A polymer is obtained which has a crystalline fraction of 28% and which after having been vulcanized in the unloaded condition has an ultimate tensile strength of 110 kg./sq. cm. and an elongation of 280%.

EXAMPLE 20

The procedure of Example 2 is followed but at various polymerization temperatures. The results obtained are shown in the following table. PT=polymerization temperature in ° C.; SC=solids content in percent by weight; CF=crystalline fraction in percent; TS=ultimate tensile strength in kg./sq. cm. of an unloaded vulcanized; E=elongation in percent of an unloaded vulcanizate.

| PT | SC | CF | TS | E |
|---|---|---|---|---|
| 5 | 24 | 17 | 97 | 480 |
| 30 | 26 | 17 | 96 | 465 |
| 40 | 29 | 18 | 94 | 430 |
| 50 | 31 | 17 | 100 | 380 |
| 60 | 31 | 17 | 102 | 330 |

EXAMPLE 21

The procedure of Example 3 is followed but the potassium salt of a mixture of resin acids is used as the emulsifier. A dispersion is obtained which has a solids content of 15% by weight. The ultimate tensile strength of the polymer after it has been vulcanized in the unloaded condition is 100.5 kg./sq. cm.

If the sodium salt of an ethenoxylated p-octylphenol be used as emulsifier under otherwise identical conditions, a dispersion is obtained which has a solids content of 18.2% by weight. The ultimate tensile strength of the polymer after it has been vulcanized is 98 kg./sq. cm.

EXAMPLE 22

The procedure of Example 3 is followed, the mixture being reacted in an autoclave at 30 atmospheres gauge for a period of fifteen minutes. A dispersion is obtained which has a solids content of 7.4% by weight.

If however the reaction be carried out in a cascade of ten reaction vessels with a residence time of one hour in each at a pressure of 10 atmospheres gauge, a dispersion is obtained which has a solids content of 12.1% by weight. In this case the ultimate tensile strength of the unloaded vulcanizate is 94 kg./sq. cm. and the crystalline fraction is 9.5%.

We claim:

1. A process for producing rubbery 1,3-diene polymers which comprises: polymerizing 1,3-dienes in aqueous emulsion using conventional polymerization catalysts and in the presence of from 0.1 to 50% by weight of a preformed polymer with reference to the total weight of the preformed polymer and monomers, said preformed polymer having a crystallinity of more than 30% by weight and being selected from the group consisting of: (a) a polyether having a formula

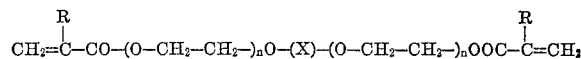

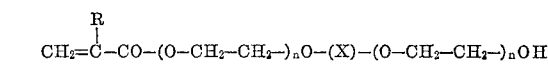

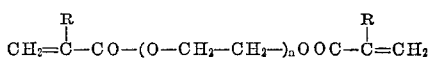

or

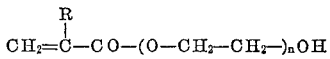

in which X is a divalent saturated or unsaturated linear or branched aliphatic, cycloaliphatic or aromatic radical, R is hydrogen or methyl and $n$ is 20 to 120

(b) a synthetic polyamide containing terminal acrylyl or methacrylyl, said polyamide having been prepared from lactams having 4 to 12 ring carbon atoms and/or salts of diamines having 4 to 10 carbon atoms and dicarboxylic acids having 4 to 10 carbon atoms, and (c) a synthetic polyurethane containing terminal acrylyl or methacrylyl, said polyurethane having been prepared from diisocyanates and diols.

2. A process as in claim 1 wherein the preformed crystalline polymer contains one to four vinyl groups and/or vinylidene groups, and has a modecular weight of from 1,000 to 50,000.

3. A process as in claim 1 wherein the preformed crystalline polymer contains one or two vinyl groups and/or vinylidene groups.

References Cited

UNITED STATES PATENTS 3,369,001  2/1968  Marshall _____ 260—857
3,321,430  5/1967  Ott _____ 260—297

MURRAY TILLMAN, Primary Examiner.

PAUL LIEBERMAN, Assistant Examiner.

U.S. Cl. X.R.

260—857, 859, 887

UNITED STATES PATENT OFFICE
CERTIFICATE OF CORRECTION

Patent No. 3,431,227  March 4, 1969

Ernst-Guenther Kastning et al.

It is certified that error appears in the above identified patent and that said Letters Patent are hereby corrected as shown below:

Column 3, line 41, "ous" should read -- out --. Column 7, line 4, "No." should be moved to the left margin; line 20, "polycarprolac-" should read -- polycaprolac- --; line 56, "vulcanized" should read -- vulcanizate --. Column 8, lines 47 and 52, "methacrylyl", each occurrence, should read -- methacrylyl groups --.

Signed and sealed this 21st day of April 1970.

(SEAL)
Attest:

Edward M. Fletcher, Jr.  
Attesting Officer

WILLIAM E. SCHUYLER, JR.  
Commissioner of Patents